(12) United States Patent
Ishida et al.

(10) Patent No.: US 8,946,595 B2
(45) Date of Patent: Feb. 3, 2015

(54) APPARATUS AND METHOD FOR DETERMINING SHAPE OF END OF WELDING BEAD

(75) Inventors: Hidenobu Ishida, Hamamatsu (JP); Naoki Ozawa, Hamamatsu (JP); Tsukasa Hagihara, Hamamatsu (JP); Shuichi Usui, Hamamatsu (JP)

(73) Assignee: Suzuki Motor Corporation (JP)

( * ) Notice: Subject to any disclaimer, the term of this patent is extended or adjusted under 35 U.S.C. 154(b) by 748 days.

(21) Appl. No.: 13/221,060

(22) Filed: Aug. 30, 2011

(65) Prior Publication Data

US 2012/0048838 A1 Mar. 1, 2012

(30) Foreign Application Priority Data

Aug. 30, 2010 (JP) ................................. 2010-192129

(51) Int. Cl.
B23K 26/03 (2006.01)
B23K 26/24 (2014.01)
B23K 31/12 (2006.01)

(52) U.S. Cl.
CPC ............. *B23K 26/246* (2013.01); *B23K 26/032* (2013.01); *B23K 31/125* (2013.01)
USPC ............. 219/121.83; 219/121.63; 219/121.85

(58) Field of Classification Search
CPC ... B23K 26/032; B23K 31/125; B23K 26/246
USPC .................. 700/166; 348/67, 90; 219/121.63, 219/121.64, 121.81, 121.83; 382/152, 181, 382/190, 199, 203, 288, 291
See application file for complete search history.

(56) References Cited

U.S. PATENT DOCUMENTS

| | | | | |
|---|---|---|---|---|
| 3,665,419 A | * | 5/1972 | Hartmann et al. | 345/418 |
| 4,767,911 A | * | 8/1988 | Maram et al. | 219/130.01 |
| 5,038,292 A | * | 8/1991 | Okumura et al. | 700/212 |
| 5,264,678 A | | 11/1993 | Powell et al. | |
| 5,481,085 A | * | 1/1996 | Kovacevic et al. | 219/130.01 |
| 5,533,146 A | * | 7/1996 | Iwai | 382/150 |
| 5,659,479 A | * | 8/1997 | Duley et al. | 700/166 |
| 5,705,788 A | * | 1/1998 | Beyer et al. | 219/121.62 |
| 6,024,273 A | * | 2/2000 | Ludewig et al. | 228/103 |
| 2002/0144984 A1 | * | 10/2002 | Mori et al. | 219/121.64 |

(Continued)

FOREIGN PATENT DOCUMENTS

| | | |
|---|---|---|
| CN | 101101277 A | 1/2008 |
| CN | 101198435 A | 6/2008 |

(Continued)

OTHER PUBLICATIONS

German Office Action dated Aug. 3, 2012.
Chinese Office Action for Application No. 201110262410 dated Nov. 6, 2013.

*Primary Examiner* — Thien S Tran
(74) *Attorney, Agent, or Firm* — Lerner, David, Littenberg, Krumholz & Mentlik, LLP

(57) ABSTRACT

An apparatus 1 of the present invention includes a laser emitting unit 2, a monitor unit 3, a storage unit 4, an image extraction unit 5, a bead recognition unit 6, and a bead shape determination unit 7. The bead shape determination unit 7 is configured to calculate the position of the end of a bead region based on the bead region recognized by the bead recognition unit 6, and to determine whether the shape of the end of the bead region is convex or concave in the extending direction of the bead region.

10 Claims, 9 Drawing Sheets

(56) References Cited

U.S. PATENT DOCUMENTS

| | | | |
|---|---|---|---|
| 2004/0134891 A1* | 7/2004 | Schumacher | 219/121.63 |
| 2004/0251242 A1* | 12/2004 | Suh | 219/121.63 |
| 2005/0041852 A1* | 2/2005 | Schwarz et al. | 382/152 |
| 2006/0006156 A1* | 1/2006 | Huonker et al. | 219/121.64 |
| 2006/0011592 A1* | 1/2006 | Wang et al. | 219/121.64 |
| 2008/0061113 A9* | 3/2008 | Seki et al. | 228/103 |
| 2008/0105731 A1* | 5/2008 | Kodama et al. | 228/104 |
| 2010/0134628 A1* | 6/2010 | Pfitzner et al. | 348/159 |

FOREIGN PATENT DOCUMENTS

| | | |
|---|---|---|
| DE | 10225450 A1 | 12/2003 |
| EP | 1618984 A1 | 1/2006 |
| JP | 62118994 | 5/1987 |
| JP | 05071932 A | 3/1993 |
| JP | 09089524 | 4/1997 |
| JP | 2005-230913 A | 9/2005 |
| JP | 2007-326134 A | 12/2007 |
| JP | 2008229672 A | 10/2008 |

* cited by examiner

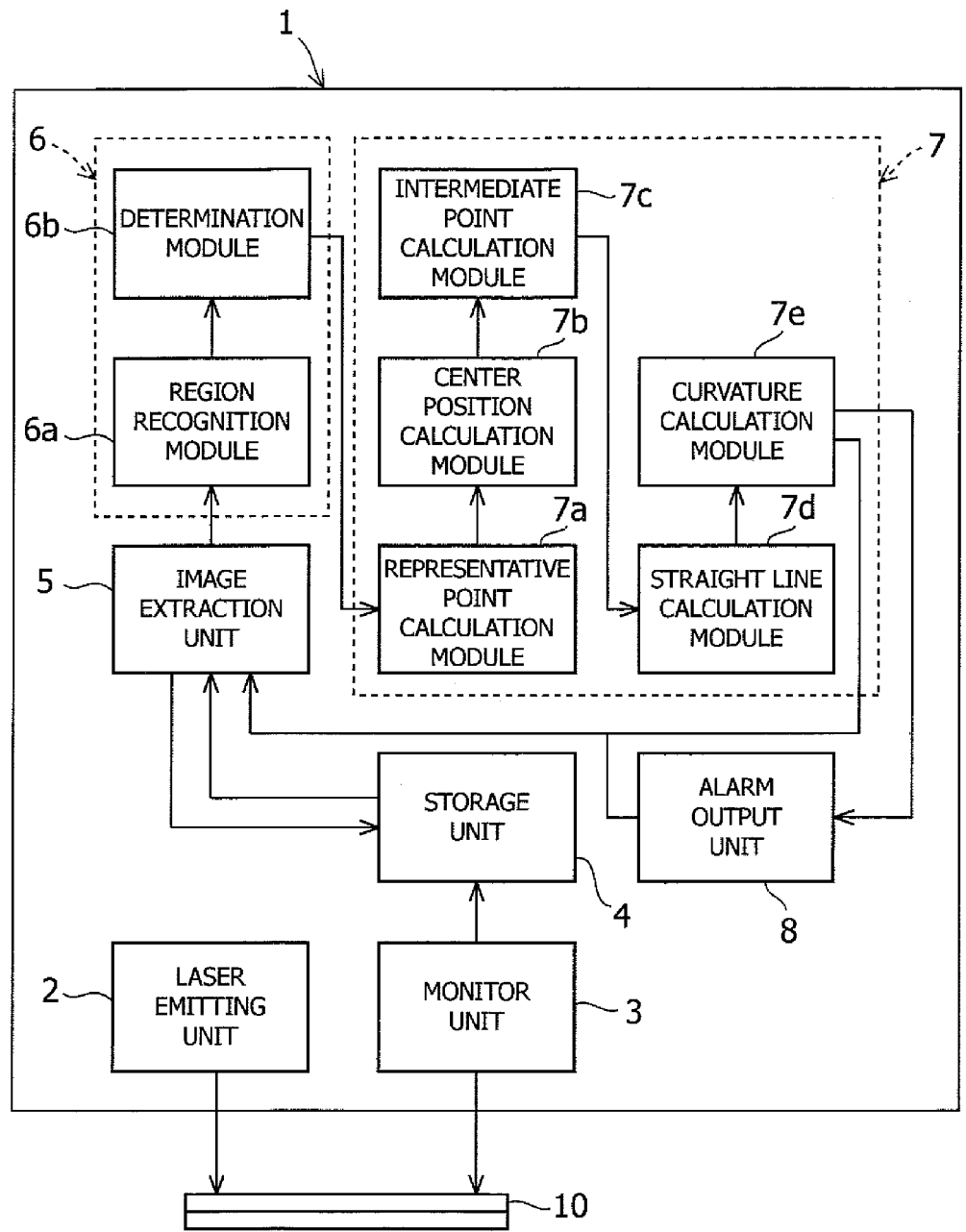

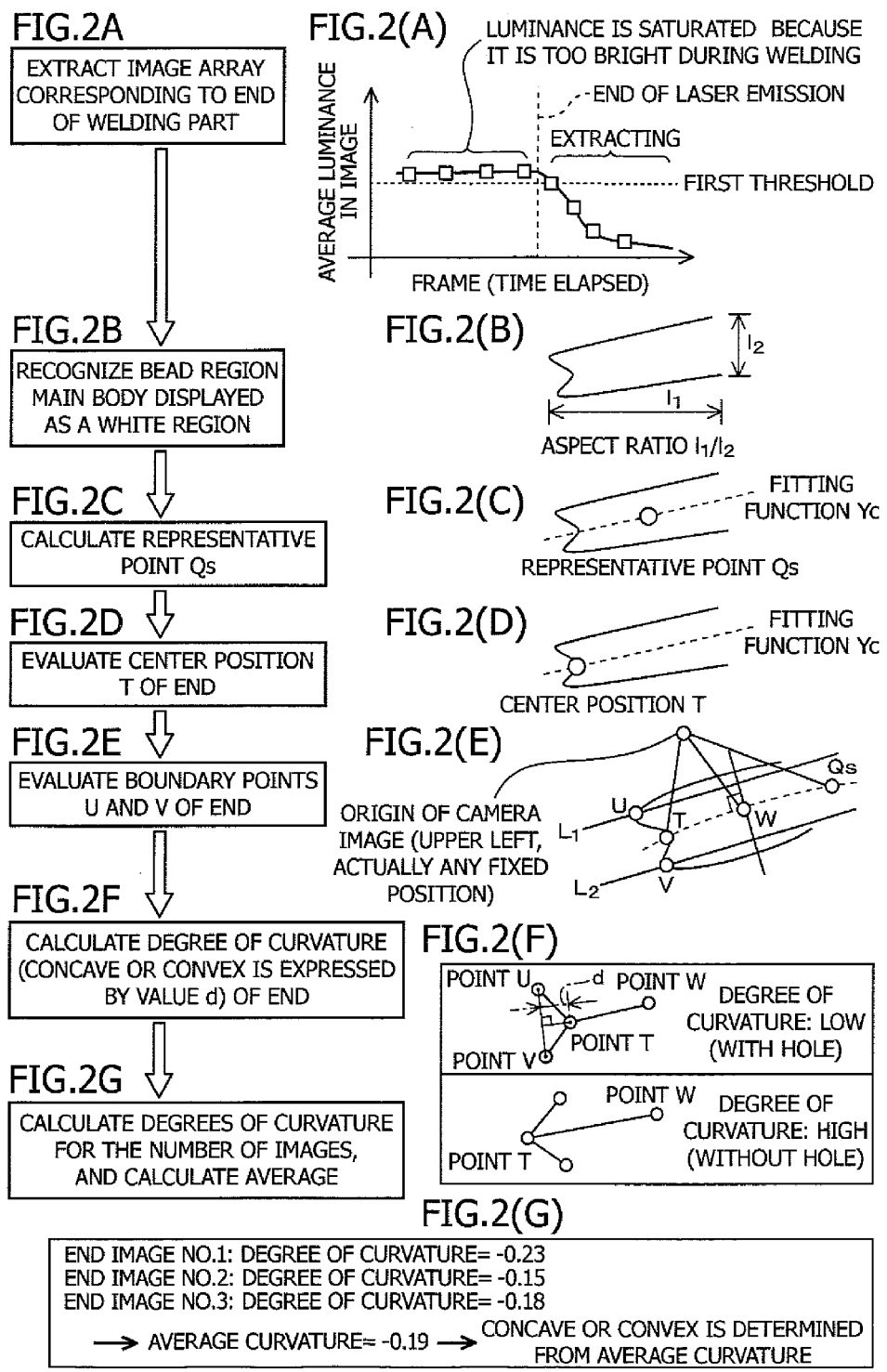

DEGREE OF CURVATURE= -0.9

DEGREE OF CURVATURE= 1.5

PROCESS OBSERVATION CAMERA

POST-WELDING OBSERVATION CAMERA

APPARATUS AND METHOD FOR DETERMINING SHAPE OF END OF WELDING BEAD

CROSS-REFERENCE TO RELATED APPLICATIONS

This application claims the benefit of the filing date of Japanese Patent Application No. 2010-192129 filed Aug. 30, 2010, the entire disclosure of which is hereby incorporated herein by reference.

BACKGROUND OF THE INVENTION

1. Field of the Invention

The present invention relates to an apparatus and to a method for determining the shape of an end of a welding bead (welding part) formed by irradiating a welding material with a welding laser. More specifically, the present invention relates to an algorithm to, in laser lap welding, capture an image of an end of a welding bead with a high-speed camera and to determine whether there is a hole defect at the end of the welding bead based on the captured image in a very short period of time immediately after the welding and before thermoluminescence from the metal ends disappears.

2. Description of Related Art

There has heretofore been proposed a method for detecting a weld defect in welding such as laser welding by obtaining a signal from a bead region (welding region) by a camera, an optical sensor and the like and analyzing the detected signal (e.g., JP 2007-326134 A (hereinafter referred to as Patent Document 1) and JP 2005-230913 A (hereinafter referred to as Patent Document 2)).

In Patent Document 1, a signal from a weld spot is taken by use of a thermal radiation sensor and a reflection sensor in a welding process, and then whether or not non-defective welding is possible is determined by comparing the change of the detected signal over time with a table of reference data associated with welding conditions. Thus, the method disclosed in Patent Document 1 prevents weld cracks or weld defects after the welding.

In addition, in Patent Document 2, a weld region is irradiated with a measuring beam, and a temperature signal obtained immediately after the welding is compared to experimentally obtained upper and lower temperature limits. Then, in Patent Document 2, a weld defect is determined by counting the number of times that the temperature signal exceeds the upper and lower temperature limits.

FIG. 11 shows an example of a case in which a signal is continuously detected from the bead region using a camera, an optical sensor and the like in laser welding.

The determination method using the detected signal as in Patent Document 1 is known to involve a phenomenon in which the detected signal at the end of the bead greatly varies when welding laser radiation and bead region monitoring are stopped at the end of the bead region, as shown in FIG. 11. For this reason, there is a problem that a weld defect at the end of the bead region cannot be determined with the same determination method as that used during the welding process.

In addition, the method disclosed in Patent Document 2 determines the weld defect based on how many times the temperature signal obtained immediately after the welding exceeds the limit values. In this method, the shape itself of the end of the bead region is not observed at all. For this reason, a weld defect at the end of the bead region may not be accurately determined. Moreover, the method disclosed in Patent Document 2 also requires an apparatus for emitting a measuring laser in addition to the welding laser, leading to a problem of increasing the cost of the apparatus.

FIGS. 12A and 12B show images of the end of the bead region captured with a camera. FIG. 12A shows the image with a hole defect at the end of the bead region, whereas FIG. 12B shows the image in a case in which the welding is normally completed. As shown in FIG. 12A, when a hole defect occurs at the end of the bead region, the end of the bead region is made concave in the extending direction of the bead. On the other hand, as shown in FIG. 12B, when the welding is normally completed, the end of the bead region is made convex in the extending direction of the bead.

Meanwhile, there has heretofore been proposed a method for examining a hole defect at the end of the bead region after a welding process is fully completed. For example, in what is called a backlight type examination method, illumination light is emitted onto a weld face from the back in a separate step after the laser welding process is fully completed, and the presence of a hole defect is determined by detecting the light leaking to the front. However, this method has a problem of reduction in production efficiency since the examination process is added as an extra step after the welding is completed.

SUMMARY OF THE INVENTION

The present invention was made in consideration of the foregoing problems. It is an object of the present invention to provide an apparatus and a method for determining the shape of the end of a welding bead, which are capable of capturing an image of a welding bead region at the same time as a welding process, and determining a hole defect at the end of the bead with high accuracy within a very short period of time immediately after the welding process.

The inventors of the present application have found that a certain amount of metal thermoluminescence can be observed from the weld material while overcoming the low transmittance of the welding laser emitting unit immediately after the completion of the welding process. As a result, the inventors have discovered a method of capturing the image with a camera and the like, and utilizing the images for determination of a hole defect. In the conventional method disclosed in Patent Document 1, this image is considered unnecessary since it is the one after the welding process. The inventors of the present application have established an apparatus and a method capable of carrying out examination of a hole defect within a very short period of time after the welding process (substantially, within the welding process time), paying attention to the image immediately after the completion of the welding process and performing characteristic shape determination which was not known before.

According to the present invention, in order to solve the problems of the above described conventional technique, there is provided an apparatus for determining the shape of an end of a welding bead formed by irradiating a weld material with a welding laser, including: a laser emitting unit for emitting the welding laser onto the weld material; a monitor unit for continuously capturing images of a portion on the weld material irradiated with the welding laser; a storage unit for storing the images captured by the monitor unit; an image extraction unit for extracting one of the images from the storage unit when the average luminance within the image is equal to or less than a predetermined image extracting threshold; a bead recognition unit for recognizing a welding bead region in the image extracted by the image extraction unit; and a bead shape determination unit for calculating the position of an end of the bead region based on the bead region recognized by the bead recognition unit, and for determining whether the shape of the end of the bead region is convex or concave in the extending direction of the bead region.

In addition, according to another aspect of the apparatus in the present invention, the monitor unit includes: a first monitor device for capturing an image during a welding process; a second monitor device for capturing an image after the completion of the welding process; and a light splitting device for splitting light from the portion irradiated with the welding laser into light beams in two directions toward the first monitor device and toward the second monitor device, and the amount of light beam guided to the first monitor device is less than the amount of light beam guided to the second monitor device.

In addition, according to another aspect of the apparatus in the present invention, the bead recognition unit includes: a region recognition module for determining, as bead region candidates, regions within the image each having luminance equal to or greater than a predetermined region recognition threshold; and a determination module for determining whether each of the bead region candidates is the bead region based on an aspect ratio of the bead region candidates.

In addition, according to another aspect of the apparatus in the present invention, the bead shape determination unit includes: a representative point calculation module for calculating a representative point of the bead region; a center position calculation module for calculating a center position of the end of the bead region; an intermediate point calculation module for calculating an intermediate point between the representative point of the bead region and the center position of the end of the bead region; a straight line calculation module for calculating two straight lines which extend parallel to each other on both sides of the line connecting the center position and the intermediate point, and intersect with the periphery of the end of the bead region; and a curvature calculation module for calculating intersection points between the two straight lines and the periphery of the end, calculating a degree of curvature based on the intersection points and the center position, and then determining whether the shape of the end of the bead region is convex or concave by use of the degree of curvature.

In addition, according to another aspect of the apparatus in the present invention, the degree of curvature is a distance to the center position from a line connecting the intersection points with each other.

In addition, according to another aspect of the apparatus in the present invention, when the image extraction unit extracts a plurality of images, the curvature calculation module determines whether the shape of the end of the bead region is convex or concave by use of the average of degrees of curvature obtained from the plurality of images.

In addition, according to the present invention, there is provided a method for determining the shape of an end of a welding bead formed by irradiating a weld material with a welding laser. The method includes: emitting the welding laser onto the weld material; capturing images of a portion irradiated with the welding laser on the weld material along the time course; storing the images in a storage unit; extracting one of the images from the storage unit when the average luminance within the image is equal to or less than a predetermined image extracting threshold; recognizing a welding bead region in the image extracted from the storage unit; and calculating the position of the end of the bead region based on the recognized bead region, and determining whether the shape of the end of the bead region is convex or concave in the extending direction of the bead region.

In addition, according to another aspect of the method in the present invention, the process for capturing the images includes: splitting light from the portion irradiated with the welding laser into light beams in two directions toward a first monitor device and toward a second monitor device; capturing an image during a welding process by the first monitor device; and capturing an image after the completion of the welding process by the second monitor device, and the amount of light beam guided to the first monitor device is less than the amount of light beam guided to the second monitor device.

In addition, according to another aspect of the method in the present invention, the process for recognizing the bead region includes: determining, as bead region candidates, regions having luminance equal to or greater than a predetermined region recognition threshold within the image; and determining whether each of the bead region candidates is the bead region based on an aspect ratio of the bead region candidates.

In addition, according to another aspect of the method in the present invention, the process for determining whether the shape of the end of the bead region is convex or concave includes: calculating a representative point of the bead region; calculating a center position of the end of the bead region; calculating an intermediate point between the representative point of the bead region and the center position of the end of the bead region; calculating two straight lines which extend parallel on both sides of the line connecting the center position and the intermediate point, and intersect with the periphery of the end of the bead region; and calculating intersection points between the two straight lines and the periphery of the end, calculating a degree of curvature based on the intersection points and the center position, and then determining whether the shape of the end of the bead region is convex or concave by use of the degree of curvature.

In addition, according to another aspect of the method in the present invention, the degree of curvature is a distance to the center position from a line connecting the intersection points with each other.

In addition, according to another aspect of the method in the present invention, when a plurality of images are extracted from the storage unit, whether the shape of the end of the bead region is convex or concave is determined by use of the average of degrees of curvature obtained from the plurality of images in the step of determining whether the shape of the end is convex or concave.

The apparatus for determining the shape of an end of a welding bead in the present invention includes: a laser emitting unit for emitting the welding laser onto the weld material; a monitor unit for continuously capturing images of a portion on the weld material emitted with the welding laser; a storage unit for storing the images captured by the monitor unit; an image extraction unit for extracting one of the images from the storage unit when the average luminance within the image is equal to or less than a predetermined image extracting threshold; a bead recognition unit for recognizing a welding bead region in the image extracted by the image extraction unit; and a bead shape determination unit for calculating the position of an end of the bead region based on the bead region recognized by the bead recognition unit, and for determining whether the shape of the end of the bead region is convex or concave in the extending direction of the bead region. With this configuration, since the image obtained immediately after the welding is used to determine whether or not the shape itself of the end of the bead region is convex or concave, the hole defect at the end of the bead can be determined with higher accuracy than in the conventional configuration using the temporal change of the signal obtained during the welding process. Moreover, the hole defect at the end of the bead can be determined within a very short period of time after the welding process (substantially, within the welding process time). This eliminates the need to add an examination process as an additional process after the completion of the welding, thereby improving the production efficiency. Furthermore, with this configuration, the apparatus needs to include only the laser emitting unit for emitting the welding laser. This eliminates the need to provide a radiation unit for a measuring laser besides the one for the welding laser, unlike in the conventional case. Thus, the cost for the apparatus can be reduced.

In addition, according to the apparatus for determining the shape of an end of a welding bead in the present invention, the monitor unit includes: a first monitor device for capturing an image during a welding process; a second monitor device for capturing an image after the completion of the welding process; and a light splitting device for splitting light from the portion irradiated with the welding laser into light beams in two directions toward the first monitor device and toward the second monitor device, and the amount of light beam guided to the first monitor device is less than the amount of light beam guided to the second monitor device. Accordingly, even in the case of using small-dynamic-range monitor devices, both images of during the welding and immediately after the welding can be captured by using the two monitor devices separately during the welding and for immediately after the welding. Therefore, even in the case of using small-dynamic-range monitor devices, a hole defect at the end of the bead region can be detected using the image immediately after the welding.

In addition, according to the apparatus for determining the shape of an end of a welding bead in the present invention, the bead recognition unit includes: a region recognition module for determining, as bead region candidates, regions within the image each having luminance equal to or greater than a predetermined region recognition threshold; and a determination module for determining whether each of the bead region candidates is the bead region based on an aspect ratio of the bead region candidates. Accordingly, the bead region is recognized by a simple process such as obtaining the aspect ratio. This enables high-speed recognition process while reducing processing load on the apparatus.

In addition, according to the apparatus for determining the shape of an end of a welding bead in the present invention, the bead shape determination unit includes: a representative point calculation module for calculating a representative point of the bead region; a center position calculation module for calculating a center position of the end of the bead region; an intermediate point calculation module for calculating an intermediate point between the representative point of the bead region and the center position of the end of the bead region; a straight line calculation module for calculating two straight lines which extend parallel to each other on both sides of the line connecting the center position and the intermediate point, and intersect with the periphery of the end of the bead region; and a curvature calculation module for calculating intersection points between the two straight lines and the periphery of the end, calculating a degree of curvature based on the intersection points and the center position, and then determining whether the shape of the end of the bead region is convex or concave by use of the degree of curvature. Accordingly, the shape determination using the vector is performed for the end of the bead region in the image. This makes it possible to determine, with high accuracy, whether the shape of the end is convex or concave.

In addition, according to the apparatus for determining the shape of an end of a welding bead in the present invention, the degree of curvature is a distance to the center position from a line connecting the intersection points with each other. Accordingly, the degree of curvature can be calculated with a simple process. This enables high-speed determination processing while reducing processing load on the apparatus.

In addition, according to the apparatus for determining the shape of an end of a welding bead in the present invention, when the image extraction unit extracts a plurality of images, the curvature calculation module determines whether the shape of the end of the bead region is convex or concave by use of the average of degrees of curvature obtained from the plural images. Accordingly, the result of the degrees of curvature of the multiple images is reflected, thereby making it possible to determine, with high accuracy, whether the shape of the end is convex or concave.

The method for determining the shape of an end of a welding bead in the present invention includes: emitting the welding laser onto the weld material; capturing images of a portion irradiated with the welding laser on the weld material along the time course; storing the images in a storage unit; extracting one of the images from the storage unit when the average luminance within the image is equal to or less than a predetermined image extracting threshold; recognizing a welding bead region in the image extracted from the storage unit; and calculating the position of the end of the bead region based on the recognized bead region, and determining whether the shape of the end of the bead region is convex or concave in the extending direction of the bead region. With this method, since the image obtained immediately after the welding is used to determine whether or not the shape itself of the end of the bead region is convex or concave, the hole defect at the end of the bead can be determined with higher accuracy than in the conventional method using the temporal change of the signal obtained during the welding process. Moreover, the presence of a hole defect at the end of the welding bead can be determined within a very short period of time after the welding process (substantially, in the welding process time). This eliminates the need to add an examination process as an additional process after the completion of the welding, thereby improving the production efficiency.

In addition, according to the method for determining the shape of an end of a welding bead in the present invention, the process for capturing the images includes: splitting light from the portion irradiated with the welding laser into light beams in two directions toward a first monitor device and toward a second monitor device; capturing an image during a welding process by the first monitor device; and capturing an image after the completion of the welding process by the second monitor device, and the amount of light beam guided to the first monitor device is less than the amount of light beam guided to the second monitor device. Accordingly, even in the case of using small-dynamic-range monitor devices, both images of during the welding and immediately after the welding can be captured by using the two monitor devices separately during the welding and for immediately after the welding. Therefore, even in the case of using small-dynamic-range monitor devices, the presence of a hole defect at the end of the bead region can be determined using the image immediately after the welding.

In addition, according to the method for determining the shape of an end of a welding bead in the present invention, the process for recognizing the bead region includes: determining, as bead region candidates, regions having luminance equal to or greater than a predetermined region recognition threshold within the image; and determining whether each of the bead region candidates is the bead region based on an aspect ratio of the bead region candidates. Accordingly, the bead region is recognized by a simple process such as obtaining the aspect ratio, thereby enabling high-speed recognition processing.

In addition, according to the method for determining the shape of an end of a welding bead in the present invention, the process for determining whether the shape of the end of the bead region is convex or concave includes: calculating a representative point of the bead region; calculating a center position of the end of the bead region; calculating an intermediate point between the representative point of the bead region and the center position of the end of the bead region; calculating two straight lines which extend parallel on both sides of the line connecting the center position and the intermediate point, and intersect with the periphery of the end of the bead region; and calculating intersection points between the two straight lines and the periphery of the end, calculating a degree of curvature based on the intersection points and the center position, and then determining whether the shape of the end of the bead region is convex or concave by use of the degree of curvature. Accordingly, the shape determination using the vector is performed for the end of the bead region in the image. This makes it possible to determine, with high accuracy, whether the shape of the end is convex or concave.

In addition, according to the method for determining the shape of an end of a welding bead in the present invention, the degree of curvature is a distance to the center position from a line connecting the intersection points with each other. Accordingly, the degree of curvature can be calculated with a simple process, thereby enabling high-speed determination processing.

In addition, according to the method for determining the shape of an end of a welding bead in the present invention, when plural images are extracted from the storage unit, whether the shape of the end of the bead region is convex or concave is determined by use of the average of degrees of curvature obtained from the plural images in the determining processing to determine whether the shape of the end is convex or concave. Accordingly, the result of the degrees of curvature of the multiple images is reflected, thereby making it possible to determine, with high accuracy, whether the shape of the end is convex or concave.

BRIEF DESCRIPTION OF THE DRAWINGS

FIG. 1 is a block diagram showing a configuration of an apparatus for determining the shape of an end of a welding bead according to an embodiment of the present invention.

FIG. 2 is a diagram showing contents of processing performed by the apparatus according to the embodiment of the present invention, i.e., a procedure for determining the shape of the end of a welding bead region.

DETAILED DESCRIPTION OF PREFERRED EMBODIMENTS

Figure 3A:
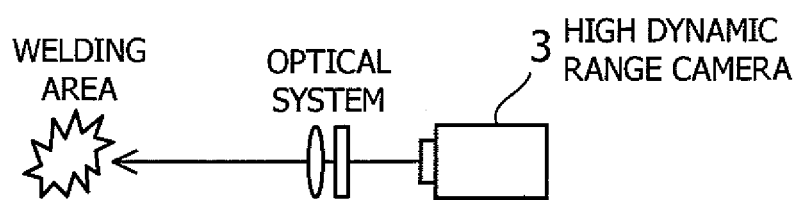
FIG. 3 is a diagram showing a configuration of a monitor unit according to the embodiment of the present invention, and an image extracting process performed by an image extraction unit.

With reference to the drawings, description is given below of an apparatus and a method for determining the shape of an end of a welding bead part (hereinafter referred to as the "bead") according to an embodiment of the present invention.

FIG. 1 is a block diagram showing a configuration of an apparatus for determining the shape of an end of a welding bead according to an embodiment of the present invention, and FIG. 2 is a diagram showing a procedure for determining the shape of the end of a welding bead region. FIG. 3 is a diagram showing a configuration of a monitor unit according to the embodiment of the present invention, and an image extracting process performed by an image extraction unit.

As shown in FIG. 1, an apparatus 1 for determining the shape of the end of the bead according to this embodiment is an apparatus used for lap welding weld materials 10. The apparatus 1 includes a laser emitting unit 2, a monitor unit 3, a storage unit 4, an image extraction unit 5, a bead recognition unit 6, a bead shape determination unit 7, and an alarm output unit 8. The respective units are described in detail below.

The laser emitting unit 2 emits a welding laser, and has a head (not shown) for emitting a laser sent through an optical fiber or the like onto the lapped weld materials 10. Note that, in this embodiment, the laser emitting unit 2 is configured to generate a laser beam having a wavelength of around 1064 nm.

As shown in FIG. 1, the monitor unit 3 is provided close to the laser emitting unit 2, and is configured to continuously capture images of a portion irradiated with the welding laser. The monitor unit 3 is formed of a high-speed camera having a frame rate of around 500 Hz, for example. Moreover, in this embodiment, as shown in FIG. 3A, the monitor unit 3 is formed of a high-dynamic-range camera. This high-dynamic-range camera has a wide dynamic range for signal detection (i.e., a wide range of luminance that can be measured), and thus can take both images of during welding and immediately after welding.

As shown in FIG. 1, the storage unit 4 is connected to the monitor unit 3, and is configured to continuously store the images captured by the monitor unit 3 along the time course.

As shown in FIG. 1, the image extraction unit 5 is connected to the storage unit 4, and is configured to extract the image immediately after the welding process is completed from among the images stored in the storage unit 4.

Here, since the transmittance of the head of the laser emitting unit 2 is optimized at a laser wavelength of around 1060 nm, the transmittance in the general visible to near-infrared light is not high. For this reason, a phenomenon that the weld material 10 emits weak light due to its heat immediately after the welding process is completed can be observed only in a short period of time of approximately several tens of milliseconds. After that, attenuation of the emission of light from the weld material 10 is increased, which makes the observation of the light difficult. As a result of the experiment, the time for which the emission of light can be observed is typically 20 ms. Therefore, in this embodiment, since the monitor unit 3 is formed of the high-speed camera having a frame rate of around 500 Hz, the image extraction unit 5 can extract around ten images (20 ms÷2 ms).

Moreover, the image extraction unit 5 determines whether or not the welding process is completed by using the average luminance within the image, so that the unit 5 can determine that the image is the one during the welding process or the one immediately after the welding process. The experiment shows that the average luminance within the image during the welding process is greater by three to four digits than that immediately after the welding process. Therefore, a predetermined first threshold (image extracting threshold) is set to be between the average luminance values of during and immediately after the welding process. As shown in Step A in FIG. 2 and FIG. 3B, the image extraction unit 5 is configured to extract an image from the storage unit 4 when the average luminance within the image is equal to or less than the predetermined first threshold (image extracting threshold). Note that since the average luminance varies significantly between during and immediately after the welding process as described above, the first threshold for extracting the image immediately after the welding process can be easily set.

Figure 3B:
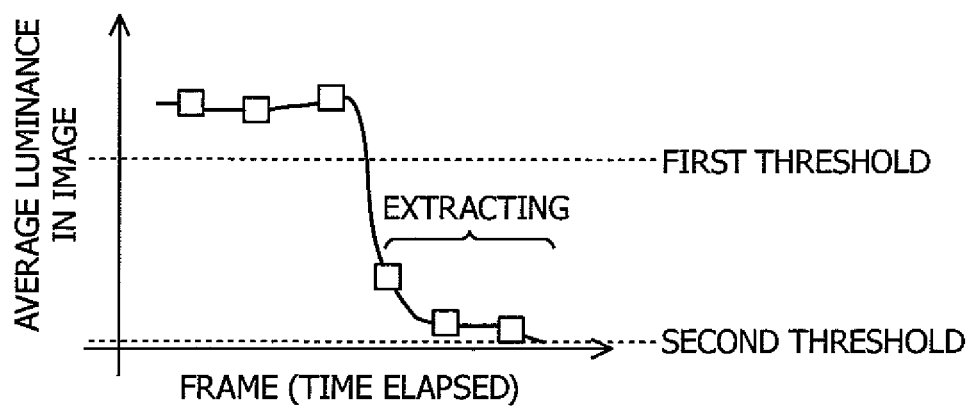

After the elapse of time for which the emission of light can be observed, the image captured by the monitor unit 3 turns black and can no longer be used to determine the end of the bead. In this embodiment, a second threshold is also set, which is less than the first threshold, and the image extraction unit 5 determines that the luminous phenomenon is finished when average luminance within the image is equal to or less than the second threshold as shown in FIG. 3B, and then terminates the image extracting process.

As shown in FIG. 1, the bead recognition unit 6 is connected to the image extraction unit 5, and processes the image extracted by the image extraction unit 5. The bead recognition unit 6 includes a region recognition module 6a and a determination module 6b. The region recognition module 6a is configured to determine regions having luminance equal to or greater than a predetermined region recognition threshold within an image as bead region candidates. In addition, the determination module 6b is configured to determine whether each of the bead region candidates is the bead region based on each aspect ratio of the bead region candidates. Next, detailed description is given of processing performed by each module in the bead recognition unit 6.

Figure 4A:
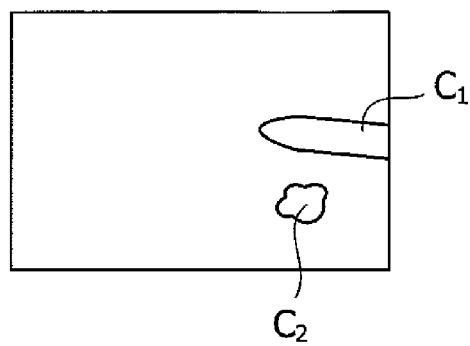
FIG. 4 is a diagram showing processing performed by a bead recognition unit and a representative point calculation module according to the embodiment of the present invention.
Figure 4B:
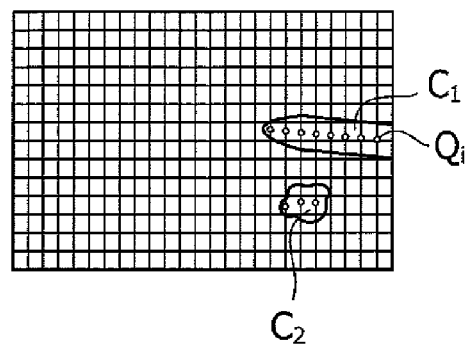

FIGS. 4A and 4B are diagrams showing image processing by the bead recognition unit 6.

As shown in FIG. 4A, the region recognition module 6a in the bead recognition unit 6 determines, as bead region candidates, regions within the image in each of which continuously has luminance equal to or greater than a predetermined region recognition threshold. Here, a bead region C1 and a region C2 of scattering sputtered particles are the bead region candidates.

Next, as shown in FIG. 4B, the determination module 6b in the bead recognition unit 6 draws straight lines at regular intervals in vertical and horizontal directions for the image, and then calculates midpoints Qi of the lines crossing the bead region candidates C1 and C2. Thereafter, as shown in Step B in FIG. 2, the determination module 6b in the bead recognition unit 6 calculates an aspect ratio (horizontal to vertical ratio) 11/12 of each of the bead region candidates C1 and C2, and determines whether or not the bead region candidates C1 and C2 are the bead regions based on the aspect ratio 11/12. Since the bead region C1, in particular, is flatter (horizontally longer) than the region C2 of the sputtered particles, the determination module 6b in the bead recognition unit 6 is configured to determine that the regions are the bead regions when the aspect ratio 11/12 is equal to or greater than the predetermined value.

However, regarding the sputtered particles scattering at high speed, when an image is captured with a camera of the monitor unit 3, the region C2 of the sputtered particles is sometimes seen as being horizontally long due to the limited exposure time of the camera. In this case, the aspect ratio 11/12 is increased also for the region C2 of the sputtered particles, which makes it difficult to determine whether the region is the bead region based on only the aspect ratio 11/12.

To counter this problem, in this embodiment, the determination module 6b in the bead recognition unit 6 determines whether the region is the bead region by further evaluating whether or not each of the bead region candidates C1 and C2 is moved between the images of time frames before and after the welding process. To be more specific, the determination is made using the fact that immediately after the completion of the welding process, the bead region C1 stays still in the image, whereas the region C2 of the sputtered particles is scattered and moved. The determination module 6b in the bead recognition unit 6 determines the region staying still in the time frames before the welding process and after the welding process as the bead region when there is more than one bead region candidate even if the aspect ratio 11/12 is set for the threshold.

As shown in FIG. 1, the bead shape determination unit 7 is connected to the bead recognition unit 6, and processes the image after the bead region is recognized by the bead recognition unit 6. The bead shape determination unit 7 calculates the position of the end of the bead region based on the bead region recognized by the bead recognition unit 6, and determines whether the shape of the end of the bead region is convex or concave in the extending direction of the bead region.

To be more specific, as shown in FIG. 1, the bead shape determination unit 7 includes a representative point calculation module 7a, a center position calculation module 7b, an intermediate point calculation module 7c, a straight line calculation module 7d, and a curvature calculation module 7e. Next, detailed description is given of each module in the bead shape determination unit 7.

Figure 4C:
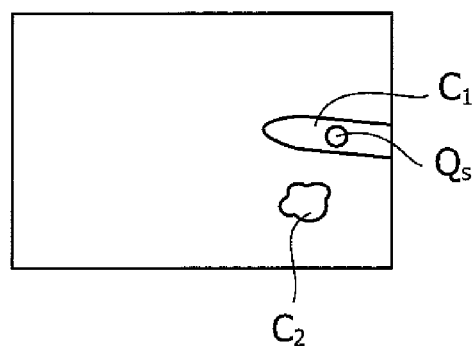

FIG. 4C is a diagram showing image processing by the representative point calculation module 7a. As shown in Step C in FIG. 2 and FIG. 4C, the representative point calculation module 7a calculates a representative point Qs of the bead region by using the set of midpoints Qi calculated by the bead recognition unit 6. To be more specific, the representative point calculation module 7a calculates, as the representative point Qs, an average position of the set of midpoints Qi (an average of ordinates of the midpoints Qi and an average of abscissas of the midpoints Qi).

Furthermore, the representative point calculation module 7a fits the set of midpoints Qi of the bead region to the quadratic function $Yc=aX^2+bX+c$. The representative point calculation module 7a performs a mathematical process (least-squares method) to determine coefficients a, b and c so as to minimize the sum of squares of the distance between the quadratic function and the midpoints Qi of the bead region. Note that the fitting function may actually be not the quadratic function Yc=aX2+bX+c but a quadratic function Xc=aY2+bY+c. In this case, fitting processing is performed for both of the functions, and then the one with a smaller fitting error is selected.

As shown in Step D in FIG. 2, the center position calculation module 7b calculates a center position T in the width direction of the end of the bead region by obtaining an intersection point in which the quadratic function Yc obtained by the representative point calculation module 7a intersects with the boundary of the bead region. The center position calculation module 7b evaluates luminance for each pixel of the image along the quadratic function Yc with the representative point Qs as a starting point, and if a portion is reached in which the luminance is less than the region recognition threshold, determines the position of the image pixel as the center position T of the end of the bead region. When such a process is performed, pixels with luminance lower than the region recognition threshold in both horizontal and vertical directions are detected. However, in a direction not toward the end, a luminance average (luminance average from the representative point Qs to the boundary) is increased, compared with the end, by the emission of light in the bead region. Therefore, a direction in which the average luminance is small is determined as the end of the bead region.

As shown in Step E in FIG. 2, in this embodiment, the intermediate point calculation module 7c is configured to calculate an intermediate point W between the representative point Qs of the bead region and the center position T of the end of the bead region. Since the bead region is sometimes formed in a curved shape, a curved portion of the bead region becomes less likely to affect the evaluation of the end by using the intermediate point W closer to the end as the base point for determination of the end. The intermediate point W may be obtained as below by calculating an average position W of two position vectors T and Q.

$$\vec{W} = \frac{1}{2}(\vec{T} + \vec{Q}_s)$$

Furthermore, as shown in Step E in FIG. 2, the straight line calculation module 7d is configured to calculate two straight lines $L_1$ and $L_2$ based on the intermediate point W calculated by the intermediate point calculation module 7c. The two straight lines $L_1$ and $L_2$ are those obtained by displacing a line TW for a certain distance in the vertical direction, the line TW connecting the center position T and the intermediate point W. The two straight lines $L_1$ and $L_2$ extend parallel on both sides of the line TW. The displacement distance is set so that the two straight lines $L_1$ and $L_2$ intersect with the periphery of the end of the bead region. Note that since the width of the bead region is not significantly changed unless there is a change in welding conditions, the displacement distance can be previously set to a constant.

As shown in Step E in FIG. 2, the curvature calculation module 7e evaluates the luminance for each pixel of the image along the straight lines L1 and L2 toward the center position T, and, if a portion is reached in which the luminance is less than the region recognition threshold, determines the positions of the image pixels as boundary points U and V, respectively.

Thereafter, as shown in Step F in FIG. 2, the curvature calculation module 7e calculates, as a degree of curvature, a distance d from the line U-V connecting the boundary points U and V with each other to the center position T. Here, the degree of curvature d takes a negative value when the center position T is on the side of the intermediate point W relative to the line U-V, and takes a positive value when the center position T is on the side opposite to the intermediate point W relative to the line U-V.

Finally, as shown in Step G in FIG. 2, the curvature calculation module 7e determines, using the degree of curvature d, whether the shape of the end of the bead region is convex or concave. In the experiment, since there is a case in which a hole is generated even when the end has a flat shape which is difficult to determine to be convex or concave, the threshold of the degree of curvature d is set to 0. Thus, the curvature calculation module 7e determines that the shape of the end is concave when the degree of curvature d is 0 or less.

Figure 5A:
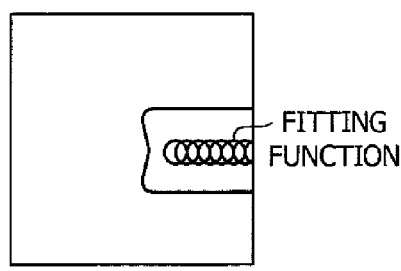
FIG. 5 shows an experimental example in which a degree of curvature is calculated by the apparatus according to the embodiment of the present invention.
Figure 5B:
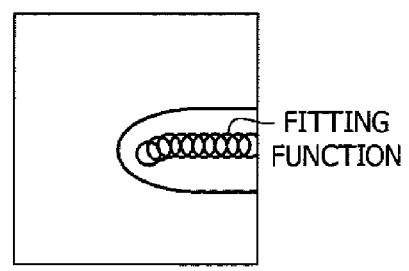

FIG. 5 shows an experimental example in which a degree of curvature d is calculated by the apparatus 1 according to this embodiment. As shown in FIG. 5A, the degree of curvature is calculated as −0.9 when the shape of the end of the bead region is concave. On the other hand, as shown in FIG. 5B, the degree of curvature is calculated as 1.5 when the shape of the end of the bead region is convex.

Moreover, the image extraction unit 5 may sometimes extract more than one image. As shown in Step G in FIG. 2, when the image extraction unit 5 extracts more than one image, the curvature calculation module 7e calculates the degree of curvature from each of the images. Thereafter, the curvature calculation module 7e determines whether the shape of the end of the bead region is convex or concave, using the average of the degrees of curvature.

The curvature calculation module 7e is connected to the alarm output unit 8 (see FIG. 1), and finally outputs a signal to the alarm output unit 8 when the shape of the end of the bead region is concave. Then, the alarm output unit 8 gives an alarm to notify an operator of a weld defect.

Figure 6:
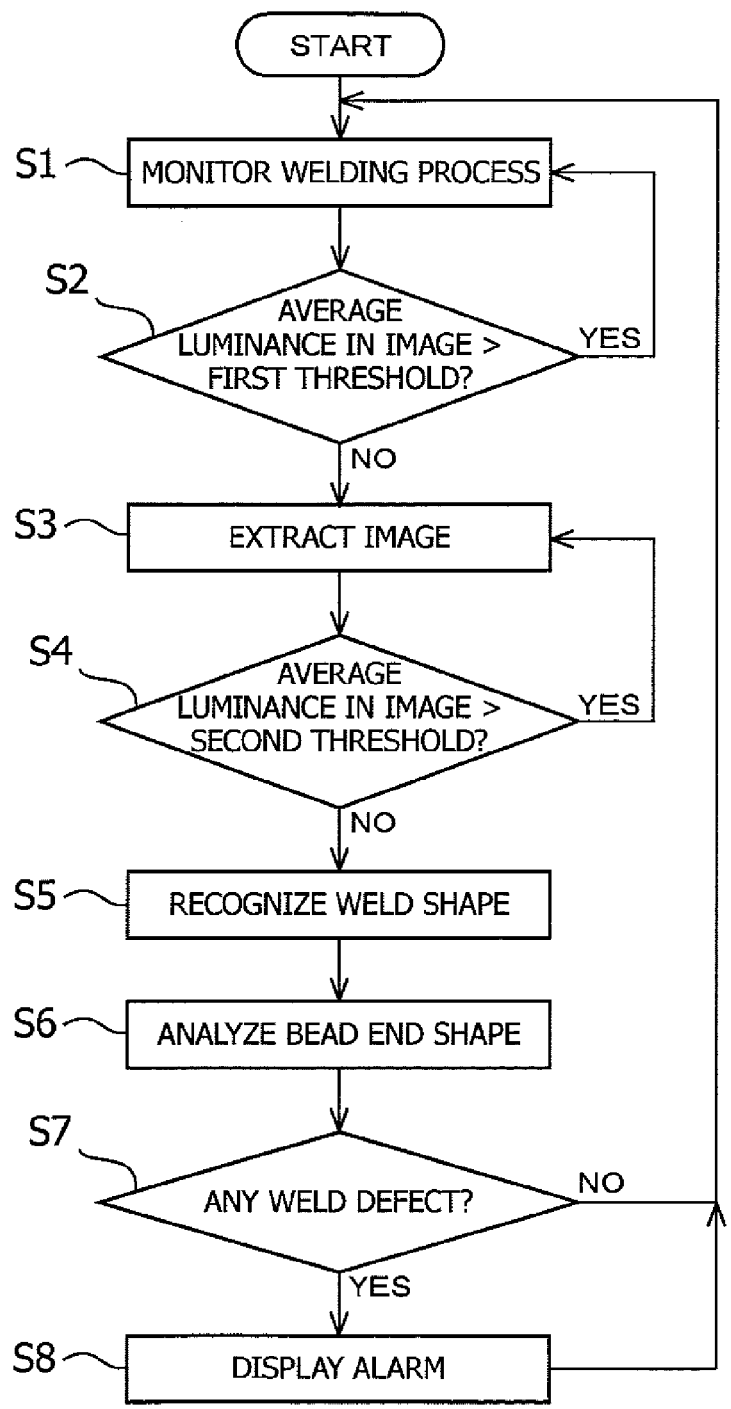
FIG. 6 is a flowchart showing an operation of the apparatus according to the embodiment of the present invention.

Next, with reference to the drawing, description is given of an operation of the apparatus 1 according to this embodiment. FIG. 6 is a flowchart showing an operation of the apparatus 1 according to this embodiment.

First, in Step S1, the monitor unit 3 continuously captures images of a portion irradiated with a welding laser. Note that the images captured by the monitor unit 3 are stored in the storage unit 4.

Next, in Step S2, the image extraction unit 5 determines whether each of the images is the one during the welding process or the one immediately after the welding process. When the average luminance within the image is equal to or less than a first threshold (NO in Step S2), the image extraction unit 5 extracts the image from the storage unit 4 in Step S3. On the other hand, when the average luminance within the image is greater than the first threshold (YES in Step S2), the monitor unit 3 continues to capture images.

Thereafter, in Step S4, the image extraction unit 5 determines whether or not the luminous phenomenon from the weld material 10 is finished.

When the average luminance within the image is equal to or less than a second threshold (NO in Step S4), the image extraction unit 5 determines that the luminous phenomenon is finished and then proceeds to Step S5. On the other hand, when the average luminance within the image is greater than the second threshold (YES in Step S4), the image extraction unit 5 continues to extract images.

Furthermore, in Step S5, the bead recognition unit 6 recognizes the weld shape in the image extracted by the image extraction unit 5. To be more specific, the bead recognition unit 6 recognizes whether the region having predetermined luminance in the image is the bead region or a region other than the bead region.

Next, in Step S6, the bead shape determination unit 7 calculates the position of the end of the bead region based on the bead region recognized by the bead recognition unit 6, and then determines whether the shape of the end of the bead region is convex or concave in the extending direction of the bead region.

Thereafter, in Step S7, the bead shape determination unit 7 determines that there is no defect when the shape of the end of the bead region is convex (NO in Step S7). On the other hand, when the shape of the end of the bead region is concave (YES in Step S7), the processing proceeds to Step S8 in which the alarm output unit 8 gives an alarm to notify an operator of a weld defect.

By performing the above steps, the shape of the end of the bead can be determined to detect a weld defect.

Figure 7:
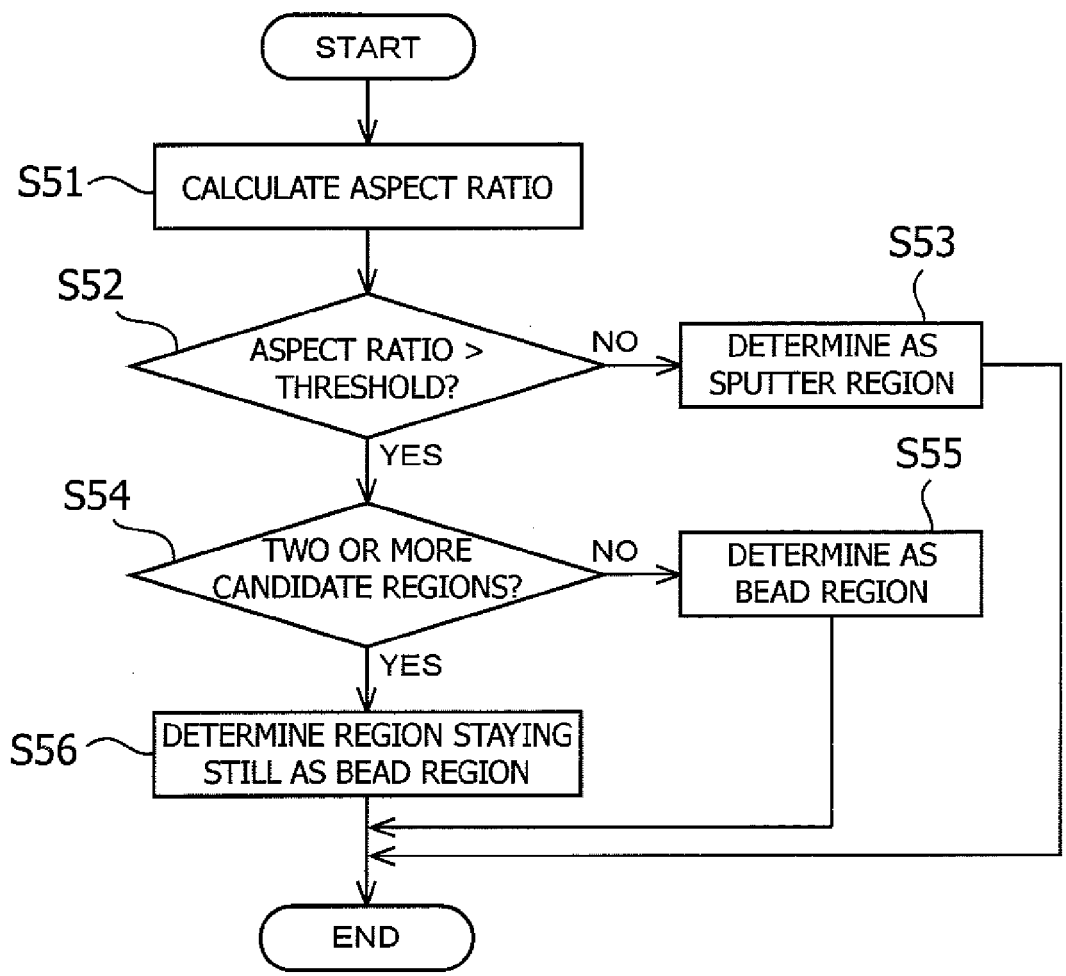
FIG. 7 is a flowchart showing an operation of the bead recognition unit in the apparatus according to the embodiment of the present invention.

Next, with reference to the drawing, detailed description is given of the weld shape recognition process (Step S5) in FIG. 6. FIG. 7 is a flowchart showing an operation of the bead recognition unit 6 according to this embodiment.

First, in Step S51, the region recognition module 6*a* in the bead recognition unit 6 determines, as bead region candidates, regions within the image in each of which continuously has luminance equal to or greater than a predetermined region recognition threshold. Thereafter, the determination module 6*b* in the bead recognition unit 6 calculates an aspect ratio (horizontal to vertical ratio) of each of the bead region candidates.

Next, in Step S52, when the aspect ratio is greater than the predetermined threshold (YES in Step S52), the processing proceeds to Step S54. On the other hand, when the aspect ratio is equal to or less than the predetermined threshold (NO in Step S52), the determination module 6*b* in the bead recognition unit 6 determines the target region as the region other than the bead region (e.g., a sputter region) in Step S53.

Thereafter, when there are two or more bead regions in Step S54 (YES in Step S54), the processing proceeds to Step S56. On the other hand, when there is only one bead region candidate (NO in Step S54), the determination module 6*b* in the bead recognition unit 6 determines the bead region candidate as the bead region in Step S55.

In Step S56, the determination module 6*b* in the bead recognition unit 6 determines that the region staying still in time frames before and after the welding process among the multiple bead region candidates is the bead region.

By performing the above steps, the weld shape in the image can be recognized.

Figure 8:
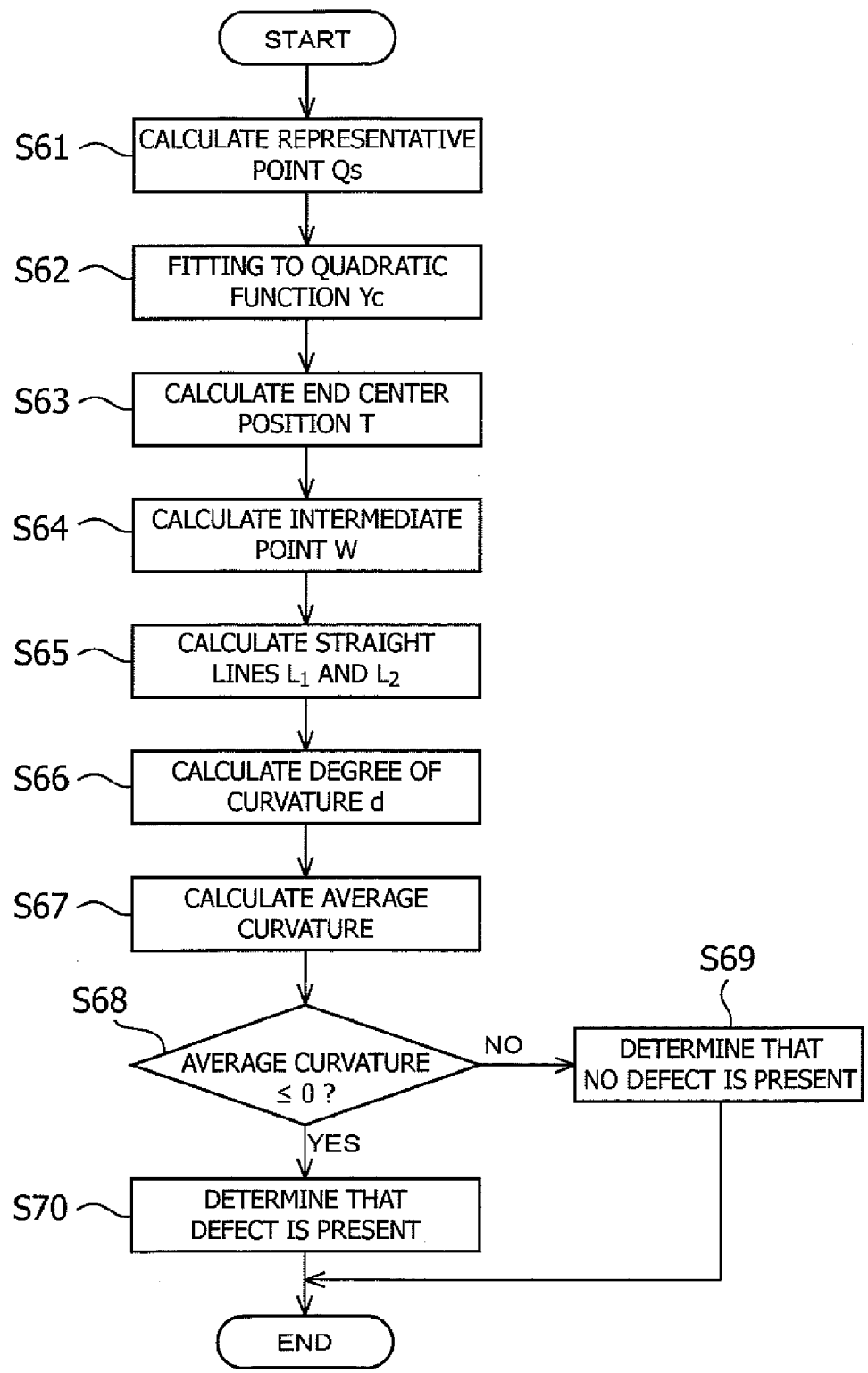
FIG. 8 is a flowchart showing an operation of a bead shape determination unit in the apparatus according to the embodiment of the present invention.

Next, with reference to the drawing, detailed description is given of the bead end shape analysis process (Step S6) in FIG. 6. FIG. 8 is a flowchart showing an operation of a bead shape determination unit 7 according to this embodiment.

First, in Step S61, the representative point calculation module 7*a* calculates a representative point Qs of the bead region by use of the set of midpoints Qi in the bead region.

Next, in Step S62, the representative point calculation module 7*a* fits the set of midpoints Qi of the bead region to the quadratic function $Yc = aX^2 + bX + c$. In this event, the representative point calculation module 7*a* performs a mathematical process (least-squares method) to determine coefficients a, b and c so as to minimize the sum of squares of the distance between the quadratic function Yc and the midpoints Qi of the bead region.

Thereafter, in Step S63, the center position calculation module 7*b* calculates a center position T of the end of the bead region by obtaining an intersection point in which the quadratic function Yc obtained by the representative point calculation module 7*a* intersects with the boundary of the bead region.

Then, in Step S64, the intermediate point calculation module 7*c* calculates an intermediate point W between the representative point Qs of the bead region and the center position T of the end of the bead region.

Next, in Step S65, the straight line calculation module 7*d* calculates two straight lines L1 and L2 based on the intermediate point W calculated by the intermediate point calculation module 7*c*. The two straight lines L1 and L2 are those obtained by displacing a line TW for a certain distance in the vertical direction, the line TW connecting the center position T and the intermediate point W. The two straight lines L1 and L2 extend parallel on both sides of the line TW.

Thereafter, in Step S66, the curvature calculation module 7*e* calculates boundary points U and V between the two straight lines L1 and L2 and the periphery of the end of the bead region, and then calculates, as the degree of curvature, a distance d from the line U-V connecting the boundary points U and V with each other to the center position T.

Subsequently, in Step S67, when more than one image is extracted, the curvature calculation module 7*e* calculates the degree of curvature d from each of the images, and then calculates an average of the degrees of curvature.

Then, in Step S68, when the average of the degrees of curvature is greater than 0 (NO in Step S68), the processing proceeds to Step S69 in which the curvature calculation module 7*e* determines that there is no defect. On the other hand, when the average of the degrees of curvature is 0 or less (YES in Step S68), the processing proceeds to Step S70 in which the curvature calculation module 7*e* determines that there is a defect.

By performing the above steps, the shape of the end of the bead region can be analyzed.

The apparatus 1 according to this embodiment includes: a laser emitting unit 2 for emitting the welding laser onto the weld material 10; a monitor unit 3 for continuously capturing images of a portion on the weld material 10 irradiated with the welding laser; a storage unit 4 for storing the images captured by the monitor unit 3; an image extraction unit 5 for extracting one of the images from the storage unit 4 when the average luminance within the image is equal to or less than a predetermined image extracting threshold; a bead recognition unit 6 for recognizing a bead region in the image extracted by the image extraction unit 5; and a bead shape determination unit 7 for calculating the position of an end of the bead region based on the bead region recognized by the bead recognition unit 6, and for determining whether the shape of the end of the bead region is convex or concave in the extending direction of the bead region.

In this embodiment, when the monitor unit 3 formed of a high-speed camera of about several 100 Hz captures an image immediately after the welding, the end of the bead region of the image is a concave luminous region if there is a hole defect, and is a convex luminous region if there is no hole defect (when there is a sink mark or when the region is flat without shrinkage sink mark). Since the apparatus 1 determines presence or absence of the hole defect using this, the hole defect at the end of the bead can be determined with greater accuracy than in the conventional configuration using the temporal change of the signal obtained during the welding process. Moreover, the presence of a hole defect at the end of the bead can be determined within a very short period of time after the welding process (substantially, in the welding process time). This eliminates the need to add an examination process as an additional process after the completion of the welding, thereby improving the production efficiency. Furthermore, with this configuration, the apparatus 1 needs to include only the laser emitting unit 2 for emitting the welding laser. This eliminates the need to provide a radiation unit for a measurement laser besides the one for the welding laser, unlike in the conventional case. Thus, the cost for the apparatus 1 can be reduced.

In addition, in the apparatus 1 according to this embodiment, the bead recognition unit 6 includes: a region recognition module 6a for determining, as bead region candidates, regions within the image each having luminance equal to or greater than a predetermined region recognition threshold; and a determination module 6b for determining whether each of the bead region candidates is the bead region based on an aspect ratio of the bead region candidates. Accordingly, the bead region is recognized by a simple process such as obtaining the aspect ratio. This enables high-speed recognition processing while reducing processing load on the apparatus 1.

In addition, in the apparatus 1 according to this embodiment, the bead shape determination unit 7 includes: a representative point calculation module 7a for calculating a representative point Qs of the bead region; a center position calculation module 7b for calculating a center position T of the end of the bead region; an intermediate point calculation module 7c for calculating an intermediate point W between the representative point Qs of the bead region and the center position T of the end of the bead region; a straight line calculation module 7d for calculating two straight lines L1 and L2 which extend parallel to each other on both sides of the line TW connecting the center position T and the intermediate point W, and intersect with the periphery of the end of the bead region; and a curvature calculation module 7e for calculating intersection points U and V between the two straight lines L1 and L2 and the periphery of the end, calculating a degree of curvature d based on the intersection points U and V and the center position T, and then determining whether the shape of the end of the bead region is convex or concave by use of the degree of curvature d. Accordingly, the shape determination using the vector is performed for the end of the bead region in the image. This makes it possible to determine, with high accuracy, whether the shape of the end is convex or concave. Also, quantitative evaluation can be made by evaluating the convex or concave shape of the end with the degree of curvature d, thereby facilitating the detection of the hole defect at the end of the bead.

In addition, in the apparatus 1 according to this embodiment, the degree of curvature d is a distance to the center position T from a line UV connecting the intersection points U and V with each other. Accordingly, the degree of curvature can be calculated with a simple process, thereby enabling high-speed determination process while reducing processing load on the apparatus 1.

Moreover, when the image extraction unit 5 extracts plural images, the curvature calculation module 7e is configured to determine whether the shape of the end of the bead region is convex or concave by use of the average of degrees of curvature obtained from the plural images. Accordingly, the result of the degrees of curvature of the multiple images is reflected, thereby making it possible to determine, with high accuracy, whether the shape of the end is convex or concave.

With reference to the drawings, description is given below of another embodiment of the apparatus for determining the shape of the end of the bead. FIG. 9 is a diagram showing a configuration of a monitor unit 3 according to another embodiment of the present invention, and an image extracting process performed by an image extraction unit 5.

In the embodiment described above, the monitor unit 3 is formed of one high-dynamic-range camera, as shown in FIG. 3, which can take both images during the welding and immediately after the welding. However, use of a small-dynamic-range camera makes it impossible to take both images during the welding and immediately after the welding with one camera. This is because the time required to switch the setting of a detection gain of the camera is not reduced to be as short as the time for which emission of light immediately after the welding can be observed, even if an attempt is made to change the setting of the detection gain between during the welding and immediately after the welding with one camera. For this reason, the image immediately after the welding cannot be captured.

Figure 9A:
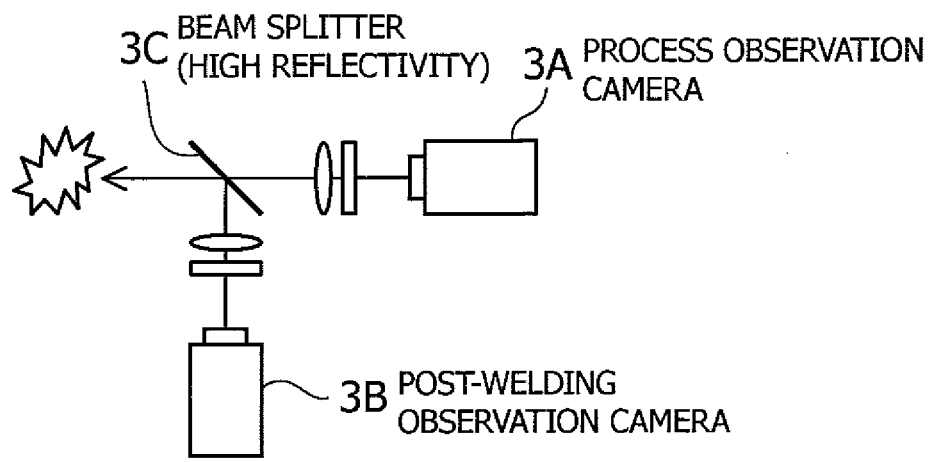
FIG. 9 is a diagram showing a configuration of a monitor unit according to another embodiment of the present invention, and an image extracting process performed by an image extraction unit according to another embodiment of the present invention.

To counter this problem, as shown in FIG. 9A, in this embodiment, a monitor unit 3 includes two cameras 3A and 3B. To be more specific, the monitor unit 3 includes: a process observation camera (first monitor device) 3A for capturing an image during the welding process; and a post-welding observation camera (second monitor device) 3B for capturing an image after the completion of the welding process.

Furthermore, as shown in FIG. 9A, the monitor unit 3 also includes a beam splitter (light splitting device) 3C for splitting the light from the portion irradiated with the welding laser into two directions, toward the process observation camera 3A and toward the post-welding observation camera 3B. Here, during the welding process, the amount of light from the portion irradiated with the welding laser is significantly increased. Thus, the amount of light beam guided to the process observation camera 3A between the two cameras 3A and 3B is set to be less than the amount of light beam guided to the post-welding observation camera 3B. To be more specific, the amount of light beam guided to the process observation camera 3A may be several % of the original amount of light from the portion irradiated with the welding laser, and most of the light may be guided to the post-welding observation camera 3B.

Figure 9B:
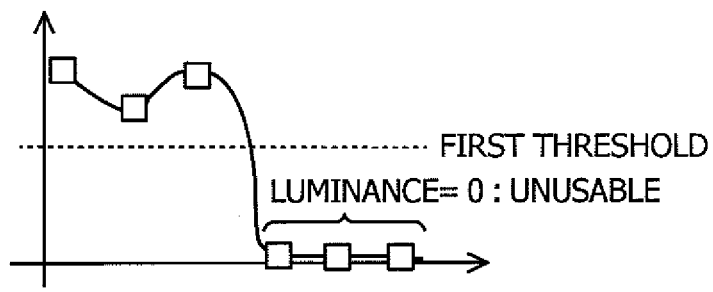
Figure 9C:
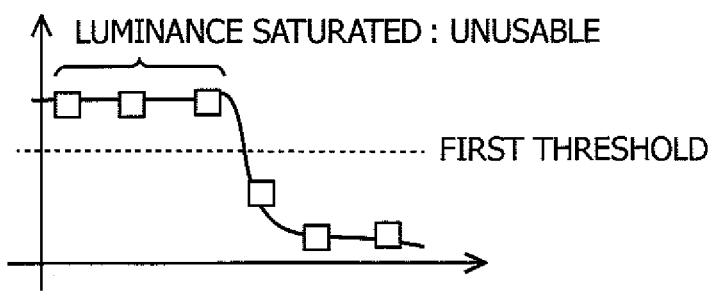

Therefore, in this embodiment, as shown in FIG. 9B, the process observation camera 3A is adjusted so that the image with high luminance during the welding process is set in the measurement range. For this reason, the image immediately after the welding turns black, and the observation can no longer be performed. Meanwhile, as shown in FIG. 9C, the post-welding observation camera 3B makes it possible to observe the image immediately after the welding, while the image during the welding process cannot be observed because it is too bright and the luminance is saturated. Note that, in this embodiment, the images captured by the two cameras 3A and 3B are stored in the storage unit 4 as in the case of the above embodiment, and subsequent processing (such as processing of obtaining average luminance and comparing it to the image extracting threshold) is also the same as that in the above embodiment.

As described above, in this embodiment, both images during the welding and immediately after the welding can be captured even if small-dynamic-range cameras are used.

Figure 10:
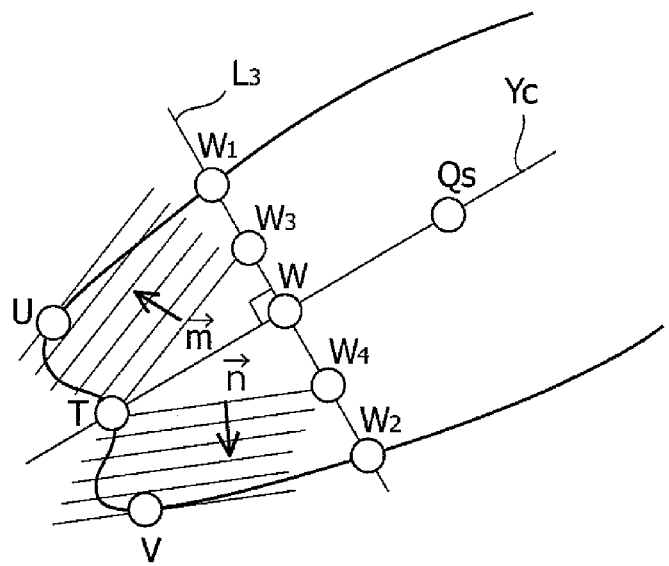
FIG. 10 is a diagram showing processing performed by a bead shape determination unit according to another embodiment of the present invention.
Figure 11:
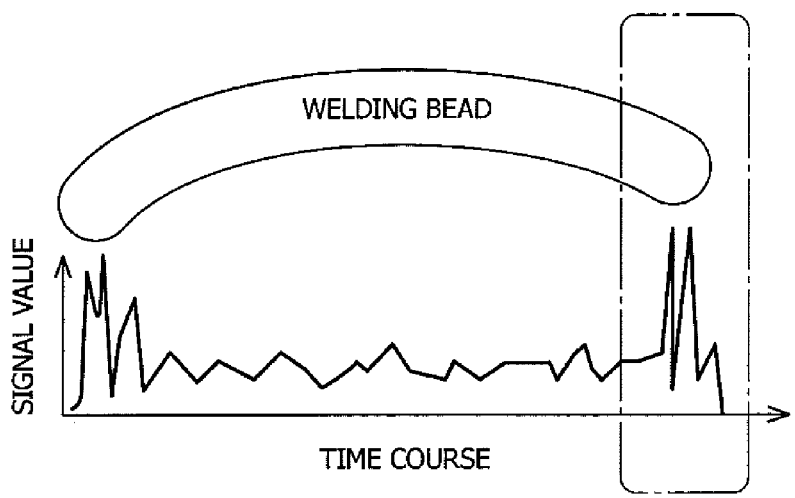
FIG. 11 is a diagram showing a conventional method for determining a weld defect in a welding bead region, i.e., showing an example when signals are continuously detected from the bead region using a camera, an optical sensor or the like when performing laser welding.
Figure 12A:
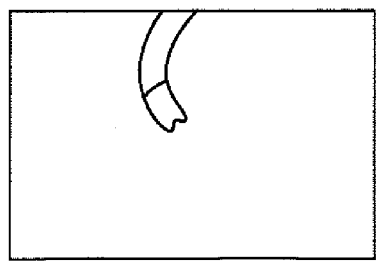
FIGS. 12A and 12B show images of the end of the bead region captured with a camera, FIG. 12A showing the image with a hole defect and FIG. 12B showing the image when the welding is normally completed.
Figure 12B:
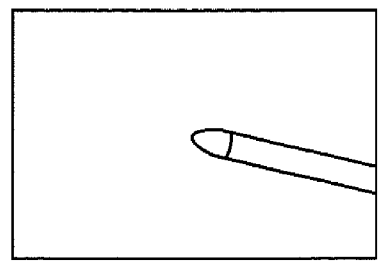

With reference to the drawing, description is given below of another embodiment of the bead shape determination unit 7. FIG. 10 is a diagram showing processing performed by a bead shape determination unit 7 according to another embodiment.

In this embodiment, as shown in FIG. 10, a straight line calculation module 7d first calculates a straight line L3 in a direction perpendicular to a line TW connecting a center position T and an intermediate point W. Then, by setting points in which the straight line L3 intersects with the periphery of the end of the bead region as intersection points W1 and W2, the straight line calculation module 7d calculates midpoints W3 and W4 of lines WW1 and WW2. The straight line calculation module 7d also calculates a line TW3 (a vector m in FIG. 10) connecting the center position T and the midpoint W3 and a line TW4 (a vector n in FIG. 10) connecting the center position T and the midpoint W4.

Thereafter, the curvature calculation module 7e parallel-moves the vectors m and n, and determines points of tangency between the parallel-moved vectors m and n and the periphery of the end of the bead region as boundary points U and V, respectively. Note that the calculation of the degree of curvature d after the determination of the boundary points U and V in this embodiment is the same processing as that in the above embodiment.

While the embodiments of the present invention have been described above, the present invention is not limited to the embodiments described above, but various changes and modifications can be made based on the technical idea of the present invention.

Although the description has been given on the lap welding in the above embodiments, the present invention is also applicable to welding likely to suffer from an isolated hole defect, such as stepwise welding and butt welding, since it is intended to determine a geometric situation of whether or not there is a hole defect at a welding position of a weld material.

Moreover, although the above embodiments are the apparatus and method for determining a hole defect at the end of the bead region, the apparatus and the method of the present invention can determine the hole defect not only at the end but also in a portion that is in the process of welding.

Description of Reference Symbols 1 apparatus
2 laser emitting unit
3 monitor unit
3A process observation camera
3B post-welding observation camera
3C beam splitter
4 storage unit
5 image extraction unit
6 bead recognition unit
6a region recognition module
6b determination module
7 bead shape determination unit
7a representative point calculation module
7b center position calculation module
7c intermediate point calculation module
7d straight line calculation module
7e curvature calculation module
10 weld material

What is claimed is:

1. An apparatus for determining the shape of an end of a welding bead formed by irradiating a weld material with a welding laser, comprising:
 a laser emitting unit for emitting the welding laser onto the weld material;
 a monitor unit for continuously capturing images of a portion on the weld material irradiated with the welding laser;
 a storage unit for storing the images captured by the monitor unit;
 an image extracting unit for extracting one of the images from the storage unit when the average luminance within the image is equal to or less than a predetermined image extracting threshold;
 a bead recognition unit for recognizing a bead region in the image extracted by the image extraction unit; and
 a bead shape determination unit for calculating the position of an end of the bead region based on the bead region recognized by the bead recognition unit, and for determining whether the shape of the end of the bead region is convex or concave in the extending direction of the bead region;
 wherein the bead shape determination unit includes
  a representative point calculation module for calculating a representative point of the bead region;
  a center position calculation module for calculating a center position of the end of the bead region;
  an intermediate point calculation module for calculating an intermediate point between the representative point of the bead region and the center position of the end of the bead region;
  a straight line calculation module for calculating two straight lines which extend parallel to each other on both sides of the line connecting the center position and the intermediate point, and intersect with the periphery of the end of the bead region; and
  a curvature calculation module for calculating intersection points between the two straight lines and the periphery of the end, calculating a degree of curvature based on the intersection points and the center position, and then determining whether the shape of the end of the bead region is convex or concave by use of the degree of curvature.

2. The apparatus according to claim 1, wherein the monitor unit includes:
 a first monitor device for capturing an image during a welding process;
 a second monitor device for capturing an image after the completion of the welding process; and
 a light splitting device for splitting light from the portion irradiated with the welding laser into light beams in two directions toward the first monitor device and toward the second monitor device, and
 wherein the amount of light beam guided to the first monitor device is less than the amount of light beam guided to the second monitor device.

3. The apparatus according to claim 1, wherein the bead recognition unit includes:
 a region recognition module for determining, as bead region candidates, regions within the image each having luminance equal to or greater than a predetermined region recognition threshold; and
 a determination module for determining whether each of the bead region candidates is the bead region based on an aspect ratio of the bead region candidates.

4. The apparatus according to claim 1, wherein the degree of curvature is a distance to the center position from a line connecting the intersection points with each other.

5. The apparatus according to claim 1, wherein
 when the image extraction unit extracts plural images, the curvature calculation module determines whether the shape of the end of the bead region is convex or concave by use of the average of degrees of curvature obtained from the plural images.

6. A method for determining the shape of an end of a welding bead formed by irradiating a weld material with a welding laser, comprising:
 emitting the welding laser onto the weld material;
 capturing images of a portion irradiated with the welding laser on the weld material along the time course;

storing the images in a storage unit;

extracting one of the images from the storage unit when the average luminance within the image is equal to or less than a predetermined image extracting threshold;

recognizing a bead region in the image extracted from the storage unit; and calculating the position of the end of the bead region based on the recognized bead region, and determining whether the shape of the end of the bead region is convex or concave in the extending direction of the bead region, wherein the process for determining whether the shape of the end of the bead region is convex or concave includes calculating a representative point of the bead region;

calculating a center position of the end of the bead region;

calculating an intermediate point between the representative point of the bead region and the center position of the end of the bead region;

calculating two straight lines which extend parallel on both sides of the line connecting the center position and the intermediate point, and intersect with the periphery of the end of the bead region; and calculating intersection points between the two straight lines and the periphery of the end, calculating a degree of curvature based on the intersection points and the center position, and then determining whether the shape of the end of the bead region is convex or concave by use of the degree of curvature.

7. The method according to claim 6, wherein the process for capturing the images includes:

splitting light from the portion irradiated with the welding laser into light beams in two directions toward a first monitor device and toward a second monitor device;

capturing an image during a welding process by the first monitor device; and capturing an image after the completion of the welding process by the second monitor device, and wherein the amount of light beam guided to the first monitor device is less than the amount of light beam guided to the second monitor device.

8. The method according to claim 6, wherein the process for recognizing the bead region includes:

determining, as bead region candidates, regions having luminance equal to or greater than a predetermined region recognition threshold within the image; and determining whether each of the bead region candidates is the bead region based on an aspect ratio of the bead region candidates.

9. The method according to claim 6, wherein the degree of curvature is a distance to the center position from a line connecting the intersection points with each other.

10. The method according to claim 6, wherein when plural images are extracted from the storage unit, whether the shape of the end of the bead region is convex or concave is determined by use of the average of degrees of curvature obtained from the plural images in the process for determining whether the shape of the end is convex or concave.

* * * * *